United States Patent [19]

Kawagishi et al.

[11] Patent Number: 5,329,624
[45] Date of Patent: Jul. 12, 1994

[54] METHOD OF CONTROLLING DATA TRANSFER BETWEEN MAIN MEMORY OF CENTRAL COMPUTER AND INPUT/OUTPUT DEVICE AND ARRANGEMENT THEREFOR

[75] Inventors: Yasuji Kawagishi; Toshiaki Someya, both of Tokyo, Japan

[73] Assignee: NEC Corporation, Tokyo, Japan

[21] Appl. No.: 813,849

[22] Filed: Dec. 27, 1991

[30] Foreign Application Priority Data

Dec. 27, 1990 [JP] Japan ................................ 2-414884

[51] Int. Cl.⁵ .............................................. G06F 13/00
[52] U.S. Cl. .................................... 395/275; 395/200; 395/250
[58] Field of Search ........................ 395/200, 250, 275

[56] References Cited

U.S. PATENT DOCUMENTS 4,841,475 6/1989 Ishizuka ............................. 395/275

FOREIGN PATENT DOCUMENTS 57-212534 12/1982 Japan .

Primary Examiner—Robert L. Richardson
Attorney, Agent, or Firm—Foley & Lardner

[57] ABSTRACT

This device enables the distance between a central computer and a peripheral device to be increased without encountering data loss from a buffer in the interconnecting channel unit. Data retrieval from the computer is initiated by the channel unit immediately after the issuance of a data retrieve instruction. The data retrieve instruction is made in response to a data write command from the computer. At the same time, the channel unit initiates connection with a peripheral device into which the data is to be written.

6 Claims, 1 Drawing Sheet

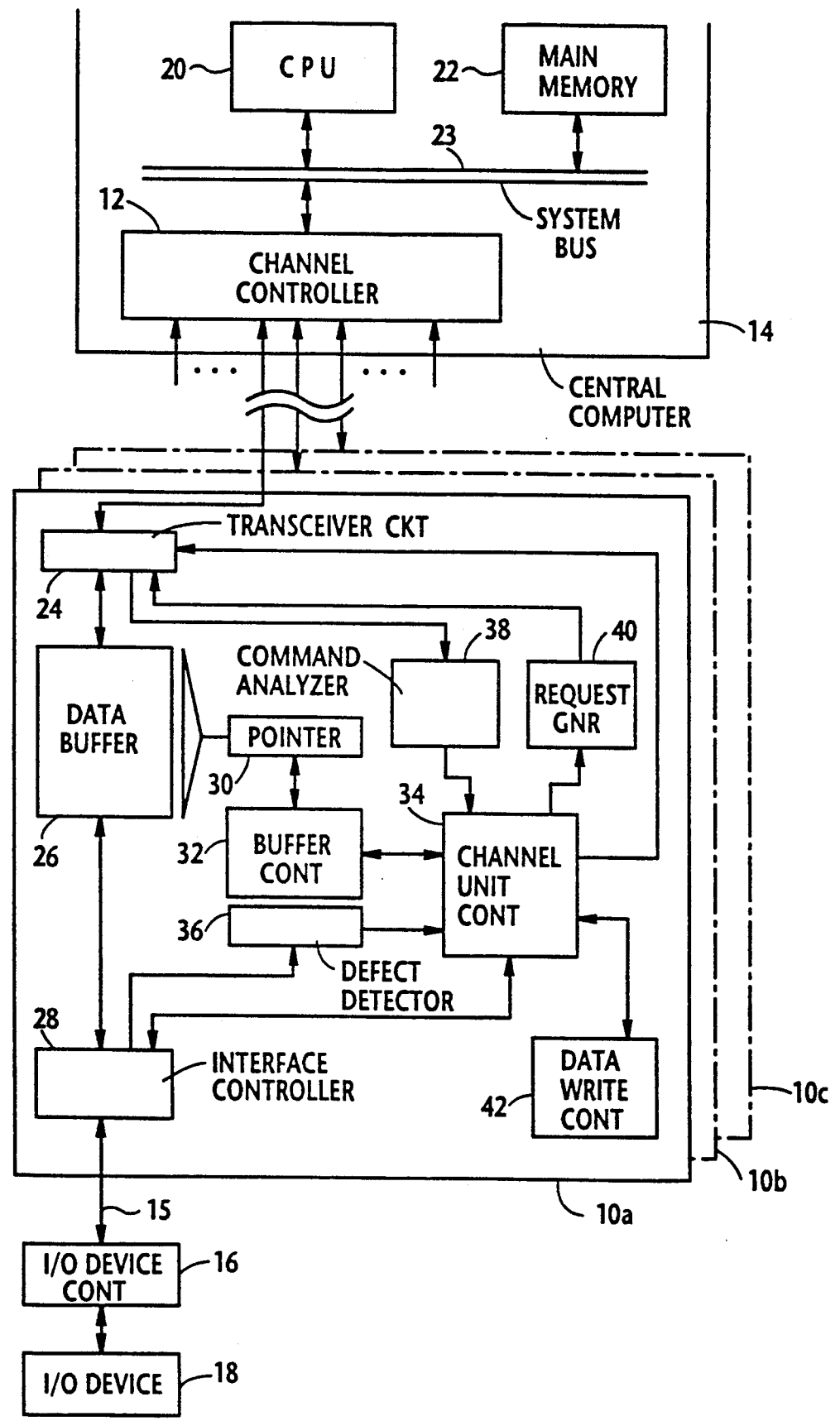

METHOD OF CONTROLLING DATA TRANSFER BETWEEN MAIN MEMORY OF CENTRAL COMPUTER AND INPUT/OUTPUT DEVICE AND ARRANGEMENT THEREFOR

Method of controlling data transfer between main memory of central computer and peripheral device and arrangement therefor.

BACKGROUND OF THE INVENTION

1. Field of the Invention

The present invention relates generally to data transfer between a central computer (CPU) and peripheral device(s). More specifically, the present invention relates to the interconnecting channel units, or buffer units, which are configured between the CPU and the peripheral devices. More specifically, the present invention relates to a technique which enables effective data buffering of the channel unit, allowing for an extension of the distance between the CPU and the peripheral devices.

2. Description of the Prior Art

In order to improve data transfer efficiency between a central computer and a plurality of peripheral devices, it is a current practice to provide a plurality of channel units between the central computer and the corresponding peripherals. Each of the channel units carries out buffering wherein data is gathered when it is not necessarily needed, thereby making the stored data readily available when it is required.

The present invention is directed to transferring data from the central computer to the peripheral. The following discussion will focus on this aspect of the present invention.

When a channel unit receives a command to write data to the peripheral device from the central computer, the channel unit initiates a connection with the peripheral device into which data is to be written. That is, the channel unit applies an "address out" (ADO) signal and a "select out" (SLO) signal to a peripheral device controller. The channel unit is able to confirm the connection with the peripheral device when it receives an "operational in" (OPI) signal therefrom. After establishing the channel connection, the channel unit issues a data transfer request to the central computer, after which the channel unit acquires data from the central computer. At this time, the data is located in a data buffer within the channel unit.

Data acquisition by the channel unit is initiated after a connection is established between the channel unit and the peripheral device controller. Therefore, during the initial stage of the data transfer (prior to the establishment of the connection), insufficient data is stored in the buffer. In more specific terms, if the peripheral device takes the form of a high speed device, such as a hard disk, the data transfer into the buffer of the channel unit is slower than the speed of the peripheral. Thus, the peripheral is apt to be forced to wait idle during a period of time when data is accumulated in the buffer of the channel unit. Accordingly, in order to avoid such a problem, the prior art undesirably limits the distance between the central computer and the peripheral devices.

SUMMARY OF THE INVENTION

It is therefore an object of the present invention to provide a method and apparatus which enables the distance a peripheral device can be located with respect to a central computer to be increased without encountering the above mentioned drawback.

In brief, the above object is achieved by techniques which enable the distance between a central computer and a peripheral device to be increased without encountering data loss from a buffer in the interconnecting channel unit. Data retrieval from the computer is initiated immediately after the issuance of a data retrieve instruction by the channel unit in response to a data write command from the computer. At the same time, the channel unit initiates connection with the peripheral device into which the data is to be written.

More specifically, a first aspect of the present invention is a method of temporarily storing data from a computer before applying it to a peripheral device, comprising the steps of: (a) determining that the computer has issued a data write command indicating data transfer from the computer to the peripheral device is required; (b) responding to this determination by issuing a data retrieve instruction to the computer for retrieving data stored in the computer to be placed into a buffer and by commencing establishment of a connection with the peripheral device; and (c) storing the data from the computer in the buffer.

A second aspect of the present invention is an arrangement for temporarily storing data from a computer before transmitting it to a peripheral device, comprising: means for determining that the computer has issued a data write command indicating data transfer from the computer to the peripheral device is required; means for responding to this determination by issuing a data retrieve instruction to the computer for retrieving data stored in the computer to be placed into a buffer and by commencing establishment of a connection with the peripheral device; and means for storing the data from the computer in the buffer.

A third aspect of the present invention is an arrangement which is provided, between a central computer and a peripheral device, for temporarily storing data from the computer, comprising: first means for controlling overall operations of the arrangement; second means arranged to store data from the computer; third means which receives, from the computer, a data write command indicating data transfer from the computer to the peripheral device is required, the third means determining the data write command; fourth means for issuing a data retrieve instruction to the computer for retrieving data stored in the computer and placing it into the second means; fifth means instructing the fourth means to produce the data retrieve instruction via the first means upon being informed of the determination of the write command by the first means; and sixth means being coupled to the first and second means and the peripheral device, the sixth means being instructed by the first means to establish connection with the peripheral device.

BRIEF DESCRIPTION OF THE DRAWINGS

The features and advantages of the present invention will become more clearly appreciated from the following description taken in conjunction with the accompanying drawings in which:

the only FIGURE is a block diagram which shows the arrangement which characterizes the present invention.

DETAILED DESCRIPTION OF THE PREFERRED EMBODIMENTS

Reference is now made to the FIGURE wherein there is shown a plurality of channel units 10a, 10b and 10c each of which functions as a buffer. Channel units 10a, 10b and 10c are each configured in exactly the same manner and are located remote from central computer 14. The distance each channel unit can be separated from central computer 14 can range up to about 2 kilometers (merely by way of example).

As shown, channel unit 10a is coupled to channel controller 12, which forms part of central computer 14, and also to peripheral device controller 16 (identified as "I/O DEVICE CONT" in the FIGURE) via I/O interface 15. Peripheral device controller 16 precedes peripheral device 18 (identified as "I/O DEVICE" in the FIGURE). Similarly, units 10b and 10c are coupled to channel controller 12. The peripheral devices which are coupled to units 10b and 10c are omitted for the sake of drawing simplicity. Central computer 14 further includes CPU (Central Processing Unit) 20 and main memory 22 which are operatively coupled, via system bus 23, with each other and also with channel controller 12.

Channel unit 10a includes transceiver circuit 24, data buffer 26, interface controller 28, pointer 30, buffer controller 32, channel unit controller 34, defect or trouble detector 36, channel command analyzer 38, data transfer request generator 40, and data write controller 42, all of which are coupled as shown.

A data write operation will be discussed by which data from main memory 22 is temporarily stored in data buffer 26 and then is written into peripheral device 18.

In order to write or transfer data stored in main memory 22 into peripheral device 18, CPU 20 supplies channel controller 12 with a data write instruction via system bus 23. Channel controller 12, in response to the write instruction applied thereto, acquires a channel command which is included in a channel control program previously memorized in main memory 22. Channel controller 12 applies the channel command thus obtained to command analyzer 38 via transceiver circuit 24. When command analyzer 38 evaluates or determines that the channel command applied thereto is the data write command, the analyzed result is applied to channel unit controller 34 which in turn activates data write controller 42 and instructs interface controller 28 to activate peripheral device controller 16.

Interface controller 28, in response to the instruction from channel unit controller 34, supplies the peripheral device controller 16 with three signals: an "input/output address" (IOD) signal, an "address out" (ADO) signal and a "select out" (SLO) signal. Thus, interface controller 28 selects the peripheral device 18 (Note that only one peripheral device is illustrated in this particular embodiment). On the other hand, data write controller 42 is responsive to the data write command from channel unit controller 34 and then requires channel unit controller 34 to instruct request signal generator 40 to issue a data transfer or retrieve request. Following this, request signal generator 40 sends the data transfer request or code to main memory 22 via transceiver circuit 24 and channel controller 12.

The data outputted from the main memory 22 is sent, via transceiver 24, to data buffer 26 which stores it in a memory area thereof whose addresses are defined by pointer 30. Buffer controller 32 monitors the amount of data stored in data buffer 26 using pointer 30. In the event that the data stored in buffer 26 reaches a predetermined value, buffer controller 32 has unit controller 34 instruct request signal generator 40 to cease the generation of the data transfer request in order to prevent data overflow.

The most important feature of the present invention is the initiation of data acquisition from main memory 22 immediately after command analyzer 38 evaluates or determines the data write command. In other words, data acquisition is commenced irrespective of whether channel unit 10a is coupled to peripheral device 18 or not.

In the event that interface controller 28 confirms that channel unit 10a is connected to peripheral device controller 16 by receiving therefrom an "operational in" (OPI) signal, and "address in" (ADI) signal and an "input/output address" (IOD) signal, unit controller 34 is informed by interface controller 28 that the connection has been established. Subsequently, channel unit controller 34 instructs interface controller 28 to prepare the data transfer to peripheral device 18 by sending thereto a "command out" (CMO) signal and a command byte. Further, when unit controller 34 confirms that the data transfer is available by a "status in" (STI) signal and a state byte both sent to interface controller 28 from peripheral device controller 16, unit controller 34 instructs buffer controller 34 to initiate the data transfer to peripheral device 18. Thus, buffer controller 32 controls pointer 30 to initiate transfer of the data stored in buffer 26 to peripheral device 18 in a sequential manner. If request generator 40 is prohibited from issuing the data transfer request at that time, unit controller 34 instructs generator 40 to again produce the data transfer request. Thus, the remaining data in main memory 22 are successively sent to buffer 26 while the data previously stored are written into the peripheral device 18.

After buffer 26 initially stores the data therein, if defect detector 36 ascertains any trouble, rendering data transfer to peripheral device 18 impossible, unit controller 34 is informed of such a malfunction and reports the malfunction to data write controller 42. In response to the indication that the data transfer to peripheral device 18 is impossible, data write controller 42 sends a request to unit controller 34. In response to this request, unit controller 34 initiates the following operations. First, unit controller 34 prevents request generator 40 from issuing the data retrieve request to central computer 14. Further, unit controller 34 advises CPU 20 of the occurrence of the malfunction, and simultaneously instructs buffer controller 32 to invalidate the data stored in buffer 26. Thus, buffer controller 32 cancels the data in buffer 26 by controlling pointer 30. Still further, unit controller 34 instructs transceiver 24 to apply the data received to buffer 26.

As will be understood from the foregoing, the present invention is such that it initiates the data acquisition into buffer 26 when command analyzer 38 determines the data write command. In other words, the data acquisition is implemented faster than the prior art which initiates the data acquisition only after confirming that the channel unit is coupled to the corresponding peripheral device controller.

The detailed descriptions of the "address out" (ADO) signal, the "select out" (SLO) signal, the "operational in" (OPI) signal, the "address in" (ADI) signal, the "input/output address" (IOD) signal, the "command out" (CMO) signal and the "status in" (STI) signal, have not been referred to for the sake of brevity in that these signals are known to those skilled in the art and are not directly concerned with the present invention.

While the foregoing description describes only one embodiment of the present invention, the various alternatives and modifications possible without departing from the scope of the present invention, which is limited only by the appended claims, will be apparent to those skilled in the art.

What is claimed is:

1. A method for temporarily storing data from a computer before being applied to a peripheral device comprising the steps of:
    (a) determining a data write command from said computer, said data write command indicating data transfer from said computer to said peripheral device is required;
    (b) responding to the determination of said data write command by issuing a data retrieve instruction to be applied to said computer for acquiring data stored in said computer into a buffer and by commencing establishment of a connection with said peripheral device; and
    (c) storing the data from said computer in said buffer.

2. A method as claimed in claim 1, further comprising the steps of:
    (d) determining if said peripheral device is available to accept data from said buffer; and
    (e) invalidating the data in said buffer and preventing the issuance of said data retrieve instruction in the event that said peripheral device is unavailable.

3. An arrangement for temporarily storing data from a computer before sending it to a peripheral device, comprising:
    means for determining a data write command from said computer, said data write command indicating data transfer from said computer to said peripheral device is required;
    means for responding to the determination of said data write command by issuing a data retrieve instruction to said computer for acquiring data stored in said computer, said data to be placed into a buffer, and by commencing establishment of a connection with said peripheral device; and
    means for storing the data from said computer in said buffer.

4. An arrangement as claimed in claim 3, further comprising;
    means for determining if said peripheral device is available to accept data from said buffer; and
    means for invalidating the data in said buffer and preventing the issuance of said data retrieve instruction in the event that said peripheral device is unavailable.

5. An arrangement between a central computer and a peripheral device for temporarily storing data from said computer, comprising:
    first means for controlling overall operations of said arrangement;
    second means arranged to store data from said computer;
    third means which receives, from said computer, a data write command indicating data transfer from said computer to said peripheral device is required, said third means determining said data write command;
    fourth means for issuing a data retrieve instruction to be applied to said computer for acquiring data stored in said computer into said second means;
    fifth means instructing said fourth means to produce said data retrieve instruction via said first means upon being informed of the determination of said write command by said first means; and
    sixth means being coupled to said first and second means and said peripheral device, said sixth means being instructed by said first means to establish connection with the peripheral device.

6. An arrangement as claimed in claim 5, further comprising;
    seventh means for determining if said peripheral device is available to accept data from said buffer; and
    eighth means for invalidating the data in said buffer and preventing the issuance of said data retrieve instruction in the event that said peripheral device is unavailable.

* * * * *